United States Patent
Yoon et al.

(10) Patent No.: US 9,172,867 B2
(45) Date of Patent: Oct. 27, 2015

(54) METHOD FOR RUNNING CAMERA AND ELECTRONIC DEVICE THEREOF

(71) Applicant: Samsung Electronics Co., Ltd., Gyeonggi-do (KR)

(72) Inventors: Pil-Joo Yoon, Gyeonggi-do (KR); Soo-Ji Hwang, Gyeonggi-do (KR); Jin-Hong Jeong, Gyeonggi-do (KR); Geon-Soo Kim, Gyeonggi-do (KR); Han-Jib Kim, Gyeonggi-do (KR); Kwang-Weon Park, Gyeonggi-do (KR); Jeong-Hyun Pang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/140,077

(22) Filed: Dec. 24, 2013

(65) Prior Publication Data

US 2014/0184846 A1    Jul. 3, 2014

(30) Foreign Application Priority Data

Jan. 3, 2013  (KR) .......................... 10-2013-0000689

(51) Int. Cl.
*H04N 5/232* (2006.01)
*H04N 5/335* (2011.01)
*G06T 7/40* (2006.01)
*H04N 5/225* (2006.01)

(52) U.S. Cl.
CPC ............ *H04N 5/23219* (2013.01); *G06T 7/408* (2013.01); *H04N 5/23245* (2013.01); *H04N 5/23293* (2013.01); *H04N 5/335* (2013.01); *H04N 5/2258* (2013.01)

(58) Field of Classification Search
CPC ............ H04N 5/2258; H04N 5/23219; H04N 5/23245; H04N 5/23293
USPC ............ 348/222.1, 333.01, 333.05, 0.333, 11
See application file for complete search history.

(56) References Cited

U.S. PATENT DOCUMENTS

| 2011/0076003 A1* | 3/2011 | Cho et al. ....................... 396/297 |
| 2011/0221920 A1* | 9/2011 | Gwak ......................... 348/222.1 |
| 2013/0314507 A1* | 11/2013 | Akagi ............................. 348/46 |

FOREIGN PATENT DOCUMENTS

KR    10-2007-0016627 A    2/2007

* cited by examiner

*Primary Examiner* — Paul Berardesca
(74) *Attorney, Agent, or Firm* — Cha & Reiter, LLC.

(57) ABSTRACT

A method usable by an electronic device executes at least one application operating a first camera and a second camera and determines whether an image acquired by the second camera is shaded by an object obscuring a portion of the acquired second camera image. In response to a determination the acquired second camera image is shaded, the method displays on a preview screen an image acquired by the first camera.

20 Claims, 11 Drawing Sheets

METHOD FOR RUNNING CAMERA AND ELECTRONIC DEVICE THEREOF

CLAIM OF PRIORITY

This application claims priority under 35 U.S.C. §119(a) to a Korean Patent Application filed in the Korean Intellectual Property Office on Jan. 3, 2013 and assigned Ser. No. 10-2013-0000689, the contents of which are herein incorporated by reference.

FIELD OF THE INVENTION

The present disclosure relates to an electronic device. More particularly, the present disclosure relates to a method and apparatus for running a camera in an electronic device.

BACKGROUND

Known electronic devices including smart phone and tablet Personal Computers (PCs) are equipped with cameras front and rear cameras. A camera provided in the front of the electronic device and a camera provided in the rear of the device are commonly used for different purposes. For example, the camera provided in the front of the electronic device is typically used for acquiring an image of a user and the camera provided in the rear of the electronic device is typically used for acquiring an image of an adjacent environment such as, landscapes or figures other than the user. A device user selects a camera using a camera switch menu provided by a camera application and choose the camera provided in the front of the electronic device. A user needs to directly control the camera switch menu to switch camera operation between front and rear cameras. A user experiences a burden and inconvenience of having to identify which of the front and rear cameras to operate through a preview screen and to switch to a desired camera. A system according to invention principles addresses this deficiency and related problems.

SUMMARY

The inventors have advantageously recognized a need to predict user operation of a front or rear camera in an electronic device. A system analyzes images acquired from multiple cameras in an electronic device and determines a camera operation method for the cameras. The system selects and operates a camera in response to an analysis of images acquired from each camera and determines whether a specific camera acquires an image shaded by an object and is in a shaded state. The system displays on a preview screen an image acquired from a camera in a non-shaded state in response to command.

A method usable by an electronic device, executes at least one application operating a first camera and a second camera and determines whether an image acquired by the second camera is shaded by an object obscuring a portion of the acquired second camera image as a result of blocking light reaching a camera lens with an object. In response to a determination the acquired second camera image is shaded, the method displays on a preview screen an image acquired by the first camera.

In a feature of the invention the method identifies luminance brightness color information of individual pixels of the image acquired by the second camera; compares the identified luminance brightness color information of the individual pixels with a previously stored pattern of luminance brightness color information in a previously acquired image; and in response to the comparison, determines that the second camera has been shaded by a specific object. The method determines that the second camera has been shaded by a user hand in response to the identified luminance brightness color information of the image having a pattern exhibiting a darkish red color with progression away from the image center. In response to a determination the identified luminance brightness color information of the image does not indicate a similar pattern as the previously stored pattern, the method determines that the second camera has not been shaded by the specific object; and displays a preview screen showing an image acquired by the second camera.

In another feature of the invention, the specific object comprises a portion of at least one of, a user hand and a cellular phone case and in response to a determination the second camera acquires a shaded image, maintains operation of the second camera and acquires an input of an image from the second camera. The method analyzes the image input from the second camera and identifies if the second camera acquires a non-shaded image; and in response to a determination the second camera acquires a non-shaded image subsequent to acquisition of a shaded image, uses an image input from the first camera at a changed different time of acquisition. The method also analyzes the image input from the second camera and identifies if the second camera image is not shaded by a specific object following acquisition of an image shaded by the specific object. In response to the second camera changing state from shaded to non-shaded acquisition, the method initiates acquisition of a video sequence by using the first camera at a selected time; analyzes an image input from the second camera and identifies if the second camera image is shaded by a specific object following acquisition of a non-shaded image; and in response to identifying the second camera is acquiring a shaded image following acquisition of a non-shaded image, terminates acquisition of the video sequence. The method analyzes an image input from the second camera and identifies a state transition wherein a second camera image is shaded by a specific object following acquisition of a non-shaded image and in response to identifying the transition, terminates operation of the second camera. The first camera is a camera mounted on a first surface of the electronic device, and the second camera is a camera mounted on a second surface of the electronic device.

In another feature of the invention, an electronic device comprises one or more processors for executing computer programs; an Input/Output (I/O) unit for performing data input and output operations; at least two cameras for acquiring images and videos; a memory for storing data and instructions; and one or more programs stored in the memory and configured to be executable by the one or more processors, wherein the one or more programs comprise executable instructions for: operating a first camera and a second camera; identifying a state transition by analyzing an image acquired by the second camera to identify whether the image is shaded by a specific object as a result of blocking light reaching a camera lens with the specific object and subsequent to acquisition of a non-shaded image by the second camera, displaying on a preview screen an image acquired by the first camera.

BRIEF DESCRIPTION OF THE DRAWINGS

The above features and advantages of the present invention will become more apparent from the following detailed description when taken in conjunction with the accompanying drawings in which.

DETAILED DESCRIPTION

Preferred embodiments of the present invention will be described herein below with reference to the accompanying drawings. For the purposes of clarity and simplicity, well-known functions or constructions are not described in detail as they would obscure the invention in unnecessary detail. And, terms described below, which are defined considering functions in the present invention, can be different depending on user and operator's intention or practice. Therefore, the terms should be defined on the basis of the disclosure throughout this specification.

In the following description, an electronic device includes a mobile communication terminal with a camera, a smart phone, a tablet Personal Computer (PC), a digital camera, a watch, a laptop computer, a notebook and a computer, for example. For description convenience, the following description is made assuming that the electronic device is equipped with two cameras. But, the following description is also applicable to an electronic device with three or more cameras. Shading as used herein comprises the obscuring of all or a portion of an acquired camera image as a result of blocking light reaching a camera lens with an object.

Figure 1A:
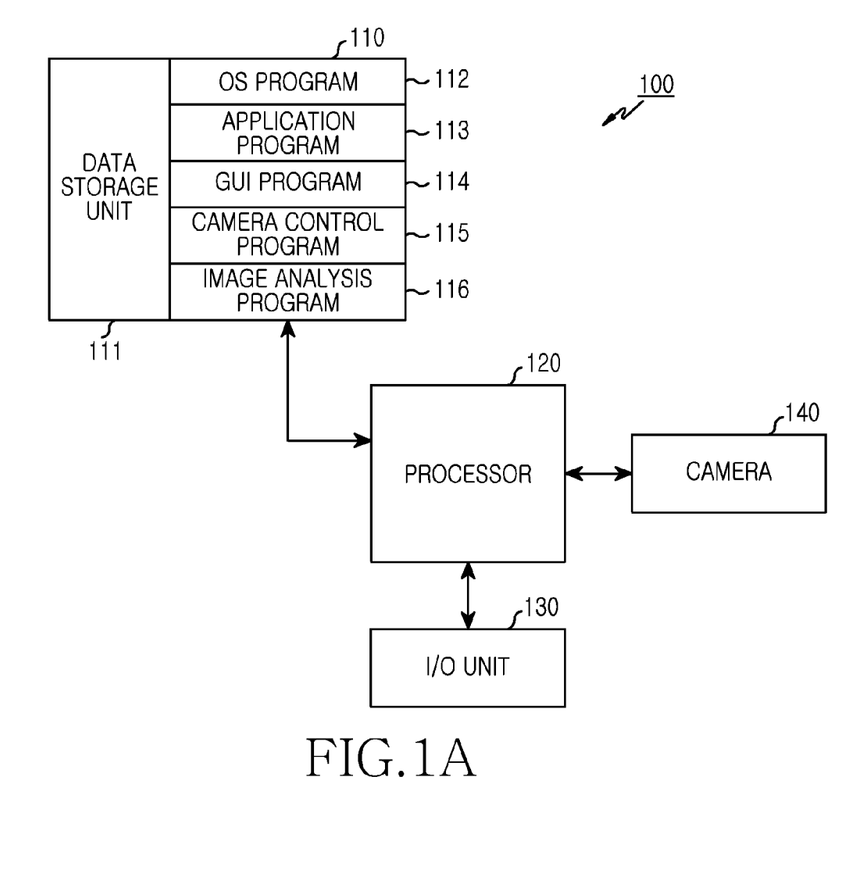
FIG. 1A shows a block diagram of an electronic device running a camera according to invention principles.

FIG. 1A shows an electronic device 100 running a camera and including a memory 110, a processor 120, an Input/Output (I/O) unit 130, and a camera 140. The memory 110 and the processor 120 may comprise a plurality of memories 110 and a plurality of processors 120. The memory 110 includes a data storage unit 111, an Operating System (OS) program 112, an application program 113, a Graphical User Interface (GUI) program 114, a camera control program 115 and an image analysis program 116. A program and a software element comprise a set of instructions and may be termed a module herein The memory 110 stores one or more programs. The data storage unit 111 stores data generated while performing a function in response to a program stored in the memory 110. The data storage unit 111 stores a color table for identifying an object shading an image provided by a 1st camera or a 2nd camera. The color table comprises at least two or more of Red, Green, and Blue (RGB) color information, and individual color data has a non-overlapping threshold value range. Data storage unit 111 uses stored color table, color information of an image acquired through a camera when the camera has acquired an image shaded by a user hand.

The OS program 112, comprises a built-in operating system such as WINDOWS, LINUX, Darwin, RTXC, UNIX, OS X, or VxWorks, comprising different software elements controlling general system operation including memory management and control, storage hardware (device) control and management, power control and management for example. The OS program 112 smoothes communication between different hardware (devices) and software elements (programs). The application program 113 comprises a browser, an electronic mail (e-mail) application, a messaging application, word processing application, an address book application, a widget application, a Digital Right Management (DRM) application, a voice recognition application, a voice replication application, a position determining function, a location-based service, a telephone application, a schedule management application and a business management application for example.

The GUI program 114 provides a graphical user interface for electronic device 100 for displaying user interface information via input/output unit 130. The GUI program 114 displays a preview screen showing an image acquired by the 1st camera and/or the 2nd camera. In response to concurrent operation of the 1st camera and the 2nd camera, the GUI program 114 provides the I/O unit 130 with one or more images input from the 1st camera or $2^{nd}$ camera, and displays the images on the preview screen. The GUI program 114 partitions the preview screen into a 1st region and a 2nd region and displays the image of the 1st camera and the image of the 2nd camera in the 1st region and the 2nd region, respectively. Further, the GUI program 114 in response to a determination that one of the 1st camera and the 2nd camera has been shaded by a specific object, provides the I/O unit 130 with an image input from the non-shaded camera, and displays the image on the preview screen. For example, when it is determined that the 1st camera has been shaded by a user hand, the GUI program 114 displays on the preview screen a non-shaded image acquired by the 2nd camera.

The camera control program 115 interoperates with the image analysis program 116 to analyze images acquired by the $1^{st}$ and 2nd cameras to determine whether a camera image (or video) has been shaded (i.e. camera in a shaded state) by a specific object and in response displays on a preview screen a non-shaded image (or video) acquired by the other camera (i.e. camera in a non-shaded state) and initiates acquisition of an image by the other camera. Further, the image analysis program 116 detects change in camera state from shaded to non-shaded and vice versa through removal of a specific shading object, for example and initiates acquisition of an image or video by the newly non-shaded camera. The image analysis program 116 detects change in camera state from non-shaded to shaded and terminates acquisition of an image or video by the newly shaded camera by stopping camera operation or powering the camera off.

The image analysis program 116 analyzes an image acquired by a camera and determines if the camera has been shaded by a specific object by comparing a received image acquired by each camera with a color table previously stored in the data storage unit 111. A color table stores data identifying a color pattern of an image shaded by a specific object and acquired by a camera. For example, when a camera has been shaded by a user hand, a shaded image has a pattern exhibiting a substantial red color area in the image with a more darkish red color further away from image center. The color table comprises RGB color information storing RGB pixel color luminance level of image areas identifying individual pixel colors identifying a predominant red color, for example. An image is divided into pixels of a specific size having corresponding RGB color information of individually recorded level enabling the image analysis program 116 to determine whether an image has been shaded by a specific object.

Further, the image analysis program 116 analyzes an image acquired by a camera and determines whether a specific object having shaded the camera has disappeared. The processor 120 comprises at least one processor and peripheral interface. The I/O unit 130 includes an input unit enabling data input and an output unit enabling data output and provides interface to a user. For example, the I/O unit 130 can be a touch screen supporting concurrent data input and output. The camera 140 acquires an image in response to user control.

Figure 1B:
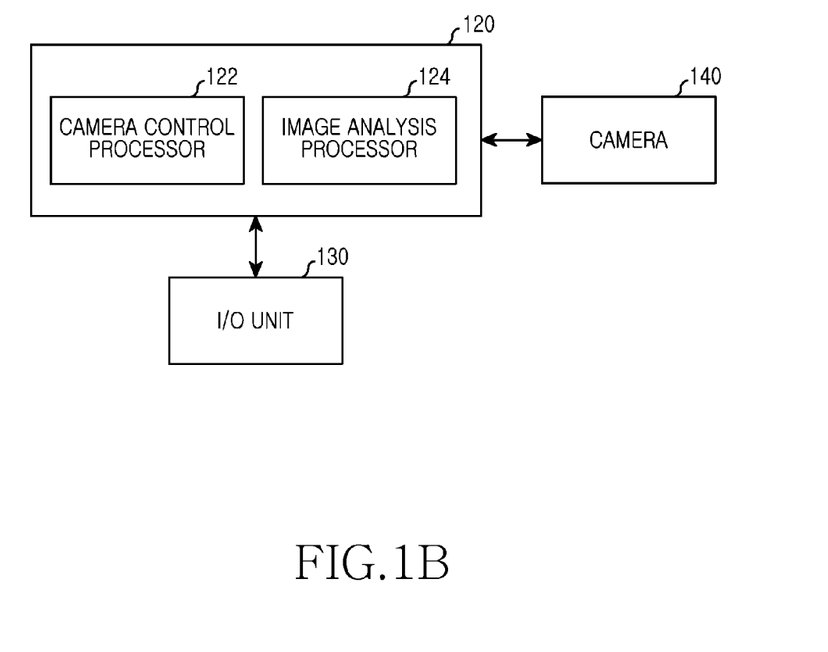
FIG. 1B shows a block diagram illustrating a construction of a processor managing a camera according to invention principles.

FIG. 1B shows a processor 120 managing a camera including a camera control processor 122 and an image analysis processor 124. The camera control processor 122 executes instructions to interoperate with the image analysis processor 124 for analyzing an image input from each of two cameras to determine whether at least one camera is in an operation state comprising acquisition of an image shaded by a specific object or has been shaded by the specific object and to display in a preview screen an image of the other camera in a non-shaded image acquisition state.

Figure 2:
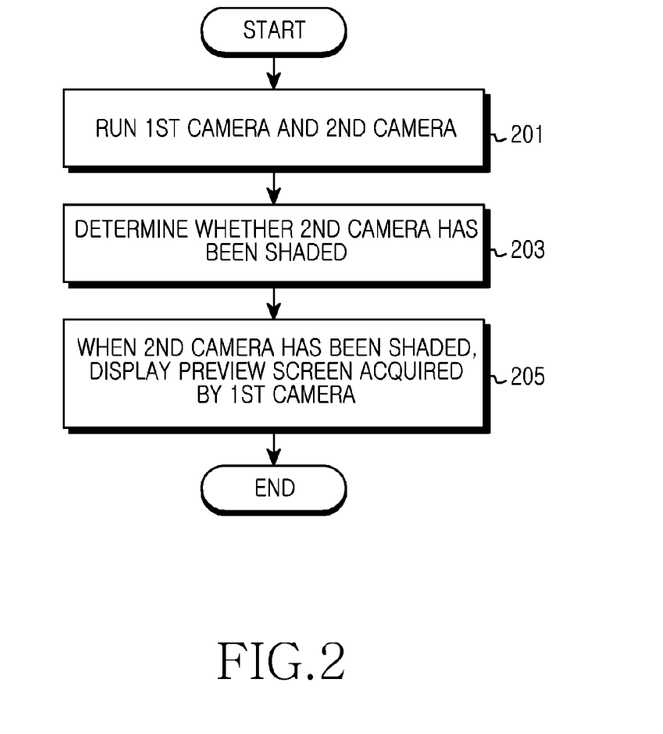
FIG. 2 shows a flowchart of a process for operating a camera in an electronic device according to invention principles.

FIG. 2 shows a process for operating a camera running in an electronic device. In step 201, the electronic device 100 operates a 1st front camera and a 2nd rear camera. 100. In step 203, the electronic device 100 determines whether the 2nd camera has acquired a shaded image by analyzing an image acquired by the 2nd camera, and determining whether the 2nd camera image is shaded by a specific object such as a user finger or a cellular phone case for example.

In step 205 in response to the 2nd camera being shaded by the specific object, device 100 determines a user has takes an impaired image through the 2nd camera and selects and displays on a preview screen an image acquired by the 1st camera. In response to device 100 determining both the 1st camera and the 2nd camera are acquiring non-shaded pages, the electronic device 100 displays on the preview screen an image of the 2nd camera according to predetermined camera priority data or image type selection priority data.

Figure 3:
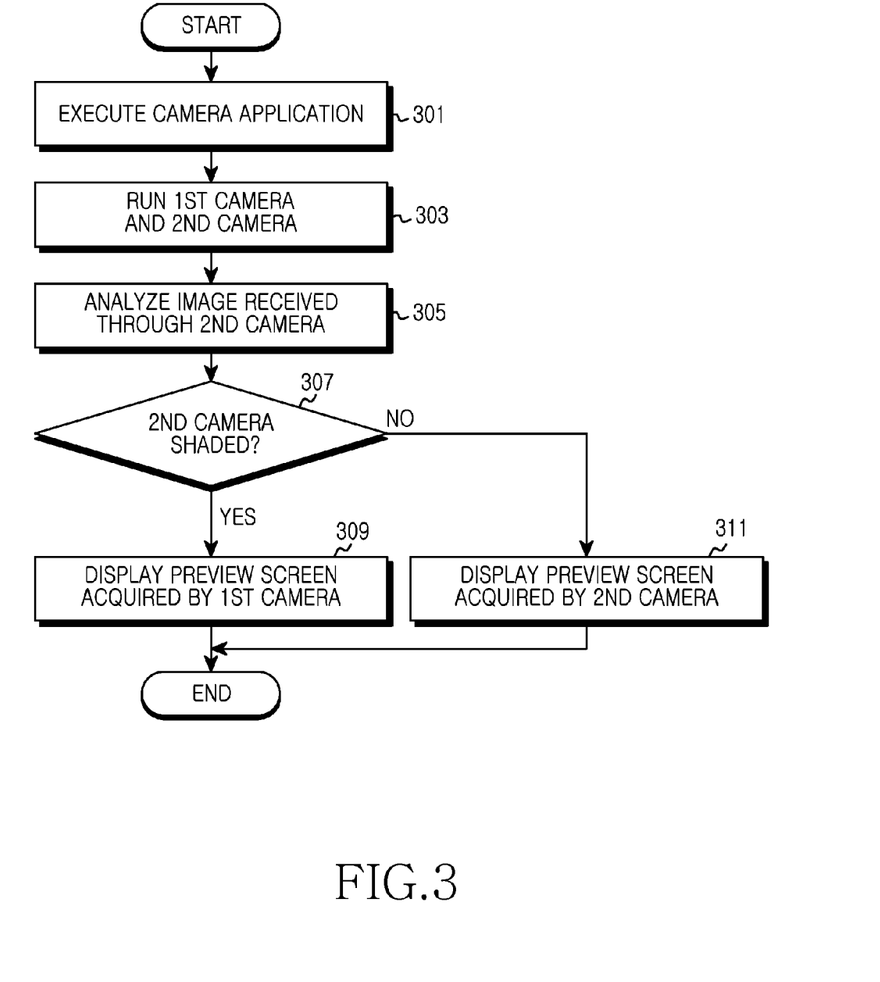
FIG. 3 shows a flowchart of a process for displaying a preview screen corresponding to one of a 1st camera and a 2nd camera in an electronic device according to invention principles.
Figure 4A:
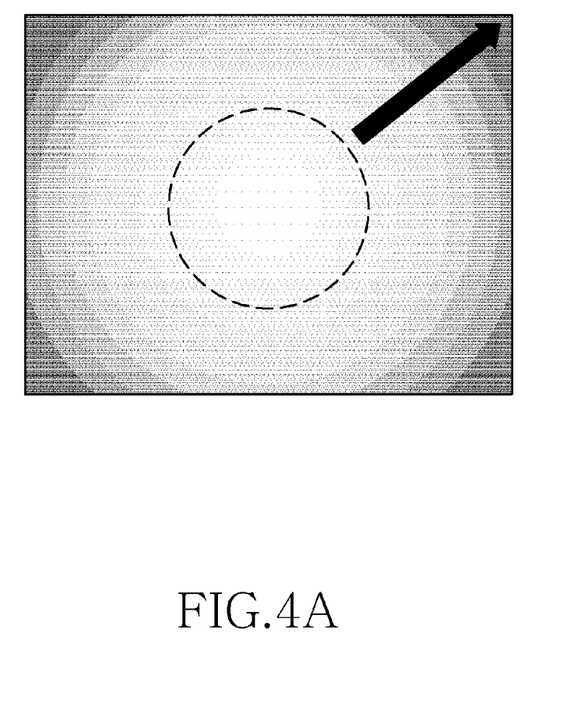
FIG. 4A, FIG. 4B and FIG. 4C illustrate determining whether a camera has been shaded by a user hand in an electronic device according to invention principles.
Figure 4B:
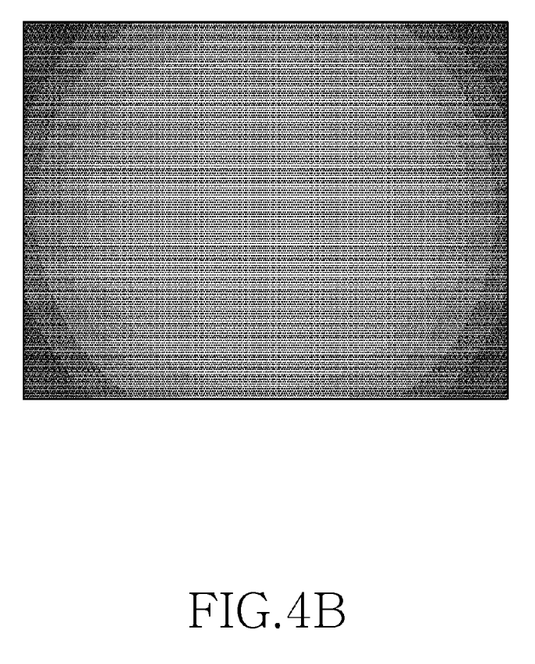

FIG. 3 shows a flowchart of a method for displaying a preview screen for one of a 1st camera and a 2nd camera in an electronic device. In step 301, the electronic device 100 senses the execution of a camera application and in step 303 initiates execution of camera applications for operation of a 1st camera and a 2nd camera. In step 305 device 100 analyzes an image received through the 2nd camera and in step 307, identifies whether an image acquired by the 2nd camera has been shaded. The electronic device 100 designates image areas comprising individual pixels or groups of pixels. In an embodiment, device 100 compares color information of individual pixels with corresponding pixel color information of a previously acquired image in a previously stored color table. In response to detecting a difference exceeding a predetermined threshold value, device 100 determines an image acquired by the 2nd camera has been shaded by a specific object such as a user finger, as illustrated in FIG. 4A. The image of FIG. 4A acquired by the 2nd camera exhibits an overall red color with the color becoming a more darkish red further away from the center. Further, when an image acquired by the 2nd camera has been shaded by a user finger in a relatively dark environment, as illustrated in FIG. 4B, the image received through the 2nd camera exhibits an overall darkish red color with the color becoming a more dark red with progression away from the center.

Figure 4C:
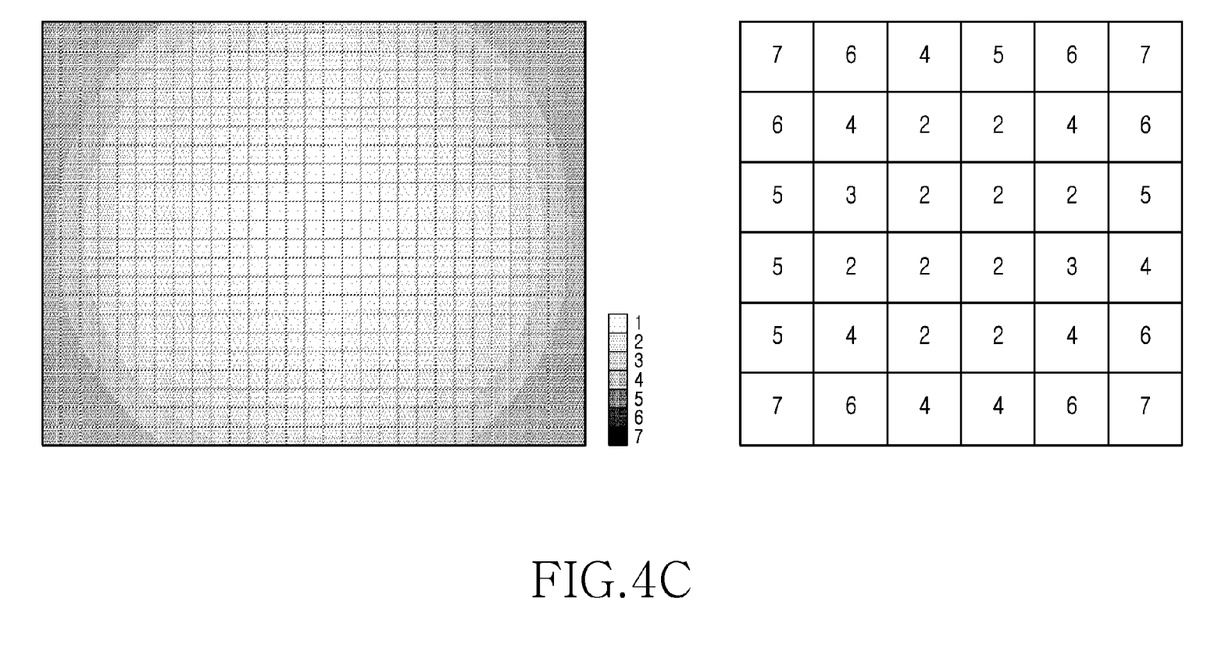

The electronic device 100 analyzes the image acquired by the 2nd camera, and distinguishes whether the 2nd camera has been shaded by a user hand or whether a camera environment is merely dark. For example, as illustrated in FIG. 4C, the electronic device 100 divides an acquired image of the 2nd camera into a plurality of groups of pixels and identifies luminance brightness level of groups of pixels (or individual pixels in another embodiment). A luminance brightness level is divided into 7 levels (level 1 to level 7) in ascending order of luminance brightness magnitude, for each RGB (Red, Green, Blue) color with each color luminance brightness having a predetermined threshold range value. Device 100 determines that the 2nd camera has been shaded by a user hand in response to an image acquired by the 2nd camera having a luminance brightness pattern with a relatively low brightness level at the center of the received image and having a progressively relatively higher brightness level with distance away from the center. Otherwise device 100 determines that the 2nd camera has not been shaded by a user hand.

Figure 5A:
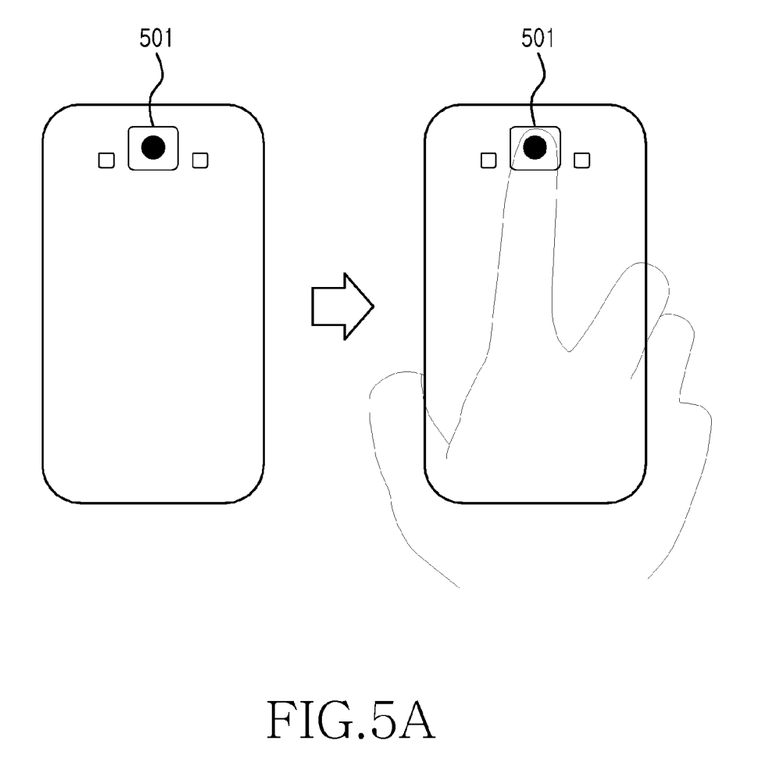
FIG. 5A illustrates a 2nd camera being shaded by a user hand in an electronic device according to invention principles.
Figure 5B:
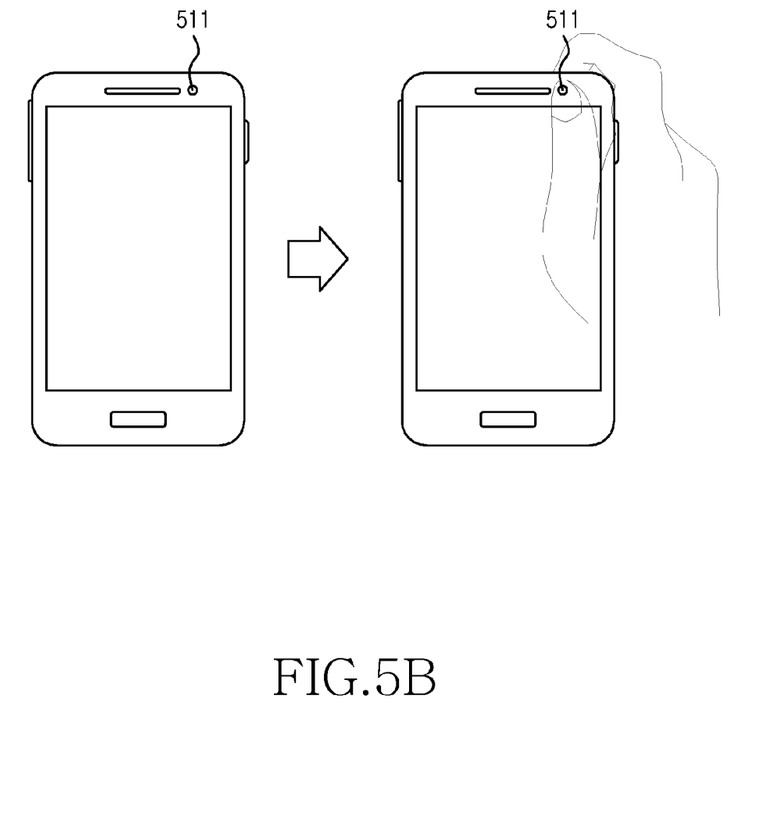
FIG. 5B illustrates a 1st camera being shaded by a user hand in an electronic device according to invention principles.
Figure 6:
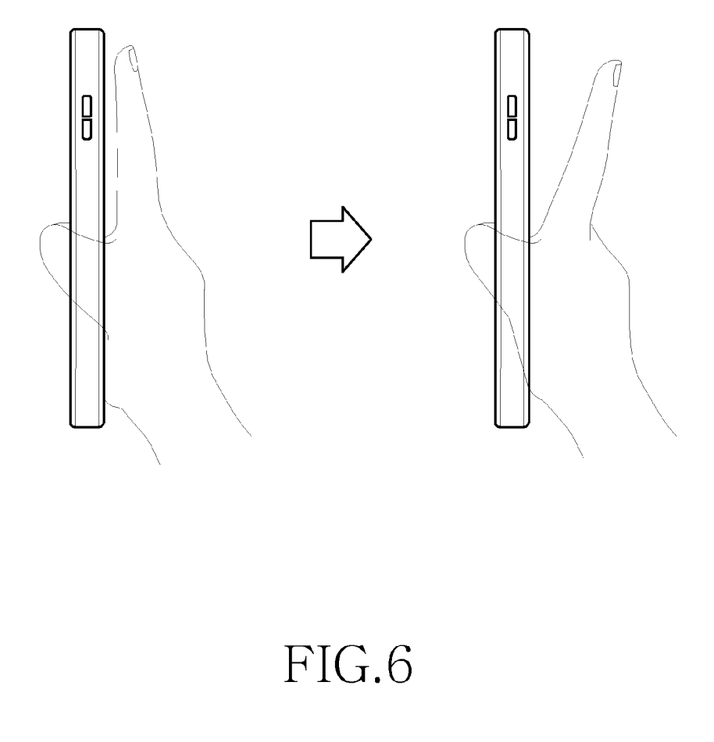
FIG. 6 shows taking an image through a 2nd camera in an electronic device according to invention principles.

If it is determined that the 2nd camera has been shaded in step 307, the electronic device in step 309 displays on a preview screen an image acquired by the 1st camera. For example, when a rear camera 501 of the electronic device 100 has been shaded as illustrated in FIG. 5A, the electronic device 100 displays an image acquired by a front camera on a preview screen and continues to analyze an image acquired by the rear camera 501 to determine whether a user hand shading the rear camera 501 is removed as illustrated in FIG. 6. In response to a front camera 511 of 30 the electronic device 100 being shaded as illustrated in FIG. 5B, device 100 can displays an image acquired by a rear camera on the preview screen and terminates the FIG. 3 process. If it is determined that the 2nd camera has not been shaded in step 307, device 100 displays an image acquired by the 2nd camera in step 311 on the preview screen and terminates the FIG. 3 process.

Figure 7A:
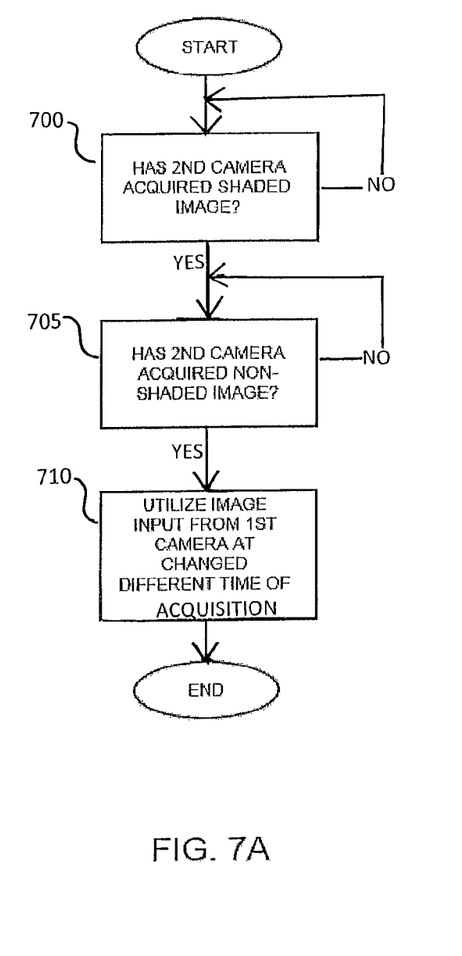
FIGS. 7A and 7B show a flowchart of a process for using an image input from the first camera and acquiring a video sequence according to acquisition of shaded and non-shaded images by the second camera.

As shown in FIG. 7A the specific object comprises a portion of at least one of, a user hand and a cellular phone case and in response to a determination the second camera acquires a shaded image, maintains operation of the second camera and acquires an input of an image from the second camera. The method analyzes the image input from the second camera and identifies if the second camera acquires a non-shaded image after acquisition of a shaded image (step 700); and in response to a determination the second camera acquires a non-shaded image subsequent to acquisition of a shaded image (step 705), uses an image input from the first camera at a changed different time of acquisition (step 710).

Figure 7B:
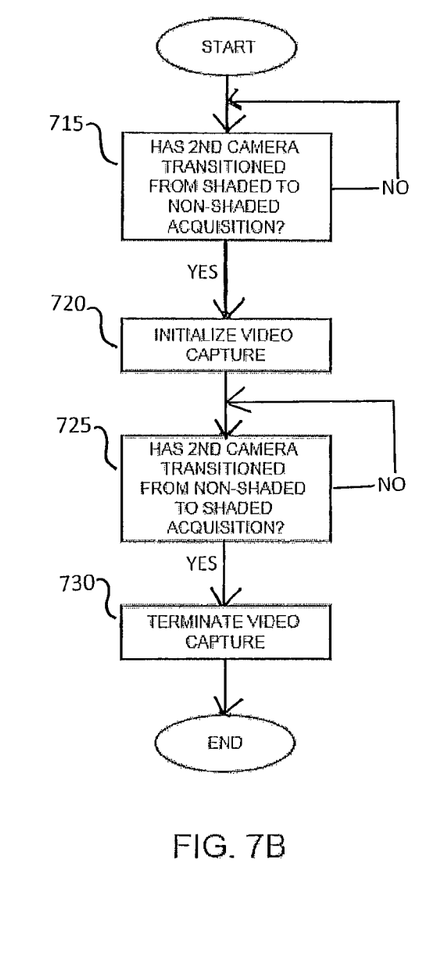

As shown in FIG. 7B, the method also analyzes the image input from the second camera and identifies if the second camera image is not shaded by a specific object following acquisition of an image shaded by the specific object. In response to the second camera changing state from shaded to non-shaded acquisition (step 715), the method initiates acquisition of a video sequence by using the first camera at a selected time (step 720); analyzes an image input from the second camera and identifies if the second camera image is shaded by a specific object following acquisition of a non-shaded image; and in response to identifying the second camera is acquiring a shaded image following acquisition of a non-shaded image (step 725), terminates acquisition of the video sequence (step 730). The method analyzes an image input from the second camera and identifies a state transition wherein a second camera image is shaded by a specific object following acquisition of a non-shaded image and in response to identifying the transition, terminates operation of the second camera.

Exemplary embodiments and all function operations described in this specification can be carried out by computer software including a structure disclosed in this specification and equivalent structures thereof, firmware, or hardware, or by a combination of them. Also, the exemplary embodiments of the present invention described in this specification can be carried out by one or more computer program products, i.e., data processing devices or can be implemented by one or more modules of computer program instructions encoded on a computer readable medium for controlling the operation of these data processing devices.

The computer readable medium can be a machine readable storage medium, a machine readable storage substrate, a memory device, a construction of materials affecting a machine readable radio wave stream, or a combination of them. The term 'data processing device' includes, for example, a programmable processor, computer or multi processor, or equipment, devices and machines for data processing including a computer. The equipment includes a code encoded in hardware and creating an execution environment for a corresponding computer program, for example, a code encoded as processor firmware, a protocol stack, data in a database management system, data in an operating system or a combination of therein.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method usable by an electronic device, comprising:
   executing at least one application operating a first camera and a second camera;
   determining whether an image acquired by the second camera is shaded by an object obscuring a portion of the acquired second camera image as a result of blocking light reaching a camera lens with an object;
   in response to a determination that the acquired second camera image is shaded by the object, determining whether the object is a specific object; and
   in response to a determination that the object is the specific object, displaying on a preview screen an image acquired by the first camera.

2. The method of claim 1, wherein determining whether the image acquired by the second camera is shaded comprises:
   identifying luminance brightness color information of individual pixels of the image acquired by the second camera; and
   comparing the identified luminance brightness color information of the individual pixels with a previously stored pattern of luminance brightness color information in a previously acquired image.

3. The method of claim 2, comprising determining whether an image acquired by the second camera is shaded by a specific object by, in response to the identified luminance brightness color information of the image having a pattern exhibiting a darkish red color with progression away from a center of the image, determining that the second camera has been shaded by a user hand.

4. The method of claim 2, further comprising:
   in response to a determination the identified luminance brightness color information of the image does not indicate a similar pattern as the previously stored pattern, determining that the second camera has not been shaded by the specific object; and
   displaying a preview screen showing an image acquired by the second camera.

5. The method of claim 2, wherein the specific object comprises a portion of at least one of, a user hand and a cellular phone case.

6. The method of claim 1, further comprising, in response to a determination the second camera acquires a shaded image, maintaining operation of the second camera and acquiring an input of an image from the second camera.

7. The method of claim 6, further comprising:
   analyzing the image input from the second camera and identifying when the second camera acquires a non-shaded image; and
   in response to a determination the second camera acquires a non-shaded image subsequent to acquisition of a shaded image, using an image input from the first camera at a changed different time of acquisition.

8. The method of claim 6, further comprising:
   analyzing the image input from the second camera and identifying when the second camera image is not shaded by a specific object following acquisition of an image shaded by the specific object;
   in response to the second camera changing state from shaded to non-shaded acquisition, initiating acquisition of a video sequence by using the first camera at a selected time;
   analyzing an image input from the second camera and identifying when the second camera image is shaded by a specific object following acquisition of a non-shaded image; and in response to identifying the second camera is acquiring a shaded image following acquisition of a non-shaded image, terminating acquisition of the video sequence.

9. The method of claim 1, further comprising, analyzing an image input from the second camera and identifying a state transition wherein a second camera image is shaded by a specific object following acquisition of a non-shaded image and in response to identifying the transition, terminating operation of the second camera.

10. The method of claim 1, wherein the first camera is a camera mounted on a first surface of the electronic device, and the second camera is a camera mounted on a second surface of the electronic device.

11. An electronic device comprising:
one or more processors for executing computer programs;
an Input/Output (I/O) unit for performing data input output operations;
at least two cameras for acquiring images and videos;
a memory for storing data and instructions; and
one or more programs stored in the memory and configured to be executable by the one or more processors,
wherein the one or more programs comprise executable instructions for:
operating a first camera and a second camera,
identifying a state transition by analyzing an image acquired by the second camera to identify whether the image is shaded by a specific object as a result of blocking light reaching a camera lens with the specific object, in response to a determination that the acquired second camera image is shaded by the object, determining whether the object is a specific object, and
in response to a determination that the object is the specific object, displaying on a preview screen an image acquired by the first camera.

12. The electronic device of claim 11, wherein the program comprises executable instructions for:
identifying pixel information of an image acquired by the second camera;
identifying luminance brightness color information of individual pixels; and
in response to determining the identified luminance brightness color information comprises a substantially similar pattern as a stored pattern, determining that the second camera has been shaded by the specific object.

13. The electronic device of claim 12, wherein the one or more programs comprise executable instructions for, in response to the identified luminance brightness color information of the image having a pattern exhibiting a progressively darker red color with distance away from a center of the image, determining that the second camera has been shaded by a user hand.

14. The electronic device of claim 12, wherein the one or more programs comprises executable instructions for:

in response to the identified luminance brightness color information of the image having a substantially different pattern from the stored pattern, determining that the second camera has not been shaded by the specific object; and
displaying a preview screen acquired by the second camera.

15. The electronic device of claim 12, wherein the specific object comprises at least one of a user hand and a cellular phone case.

16. The electronic device of claim 11, wherein the one or more programs comprise executable instructions for, in response to a determination the second camera acquires a shaded image, maintaining operation of the second camera and acquiring an input of an image from the second camera.

17. The electronic device of claim 16, wherein the one or more programs comprise executable instructions for:
analyzing the image input from the second camera and identifying when the second camera acquires a non-shaded image; and
in response to a determination the second camera acquires a non-shaded image subsequent to acquisition of a shaded image, using an image input from the first camera at a changed different time of acquisition.

18. The electronic device of claim 16, wherein the one or more programs comprise executable instructions for:
analyzing the image input from the second camera and identifying when the second camera image is not shaded by a specific object following acquisition of an image shaded by the specific object;
in response to the second camera changing state from shaded to non-shaded acquisition, initiating acquisition of a video sequence by using the first camera at a selected time;
analyzing an image input from the second camera and identifying when the second camera image is shaded by a specific object following acquisition of a non-shaded image; and
in response to identifying the second camera is acquiring a shaded image following acquisition of a non-shaded image, terminating acquisition of the video sequence.

19. The electronic device of claim 11, wherein the one or more programs comprise executable instructions for, analyzing an image input from the second camera and identifying a state transition wherein a second camera image is shaded by a specific object following acquisition of a non-shaded image and in response to identifying the transition, terminating operation of the second camera.

20. The electronic device of claim 11, wherein the first camera is a camera mounted on a first surface of the electronic device, and the second camera is a camera mounted on a second surface of the electronic device.

* * * * *